(12) United States Patent
Miyagawa

(10) Patent No.: US 6,380,966 B1
(45) Date of Patent: Apr. 30, 2002

(54) EXPOSURE RECORDING DEVICE FOR SCANNING A RECORDING MEDIUM WITH A LIGHT BEAM

(75) Inventor: Ichirou Miyagawa, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/494,376

(22) Filed: Jan. 31, 2000

(30) Foreign Application Priority Data

Jan. 29, 1999 (JP) .................................... 11-022327

(51) Int. Cl.[7] .......................... B41J 15/14; B41J 27/00
(52) U.S. Cl. ...................................... 347/241; 347/256
(58) Field of Search ................................ 347/233, 241, 347/255, 256, 239, 244, 236; 359/494, 495, 496, 629; 349/9; 372/22, 27; 385/11

(56) References Cited

U.S. PATENT DOCUMENTS

| | | | | |
|---|---|---|---|---|
| 5,134,426 A | * | 7/1992 | Kataoka et al. | 347/244 |
| 5,377,212 A | * | 12/1994 | Tatsuno et al. | 372/22 |
| 5,504,619 A | * | 4/1996 | Okazaki | 359/495 |
| 5,533,152 A | * | 7/1996 | Kessler | 385/11 |
| 5,548,444 A | * | 8/1996 | McLaughlin et al. | 359/629 |

* cited by examiner

*Primary Examiner*—Hai Pham
(74) *Attorney, Agent, or Firm*—Sughrue Mion, PLLC

(57) ABSTRACT

A light beam emitted from a light source is divided into a plurality of light beams depending on the resolution of an image to be recorded by the light beam, and the light beams are focused on a recording medium by an optical focusing system. Recorded intervals on the recording medium in an auxiliary scanning direction are controlled depending on the resolution, so that an image depending on the resolution can be recorded on the recording medium.

22 Claims, 17 Drawing Sheets

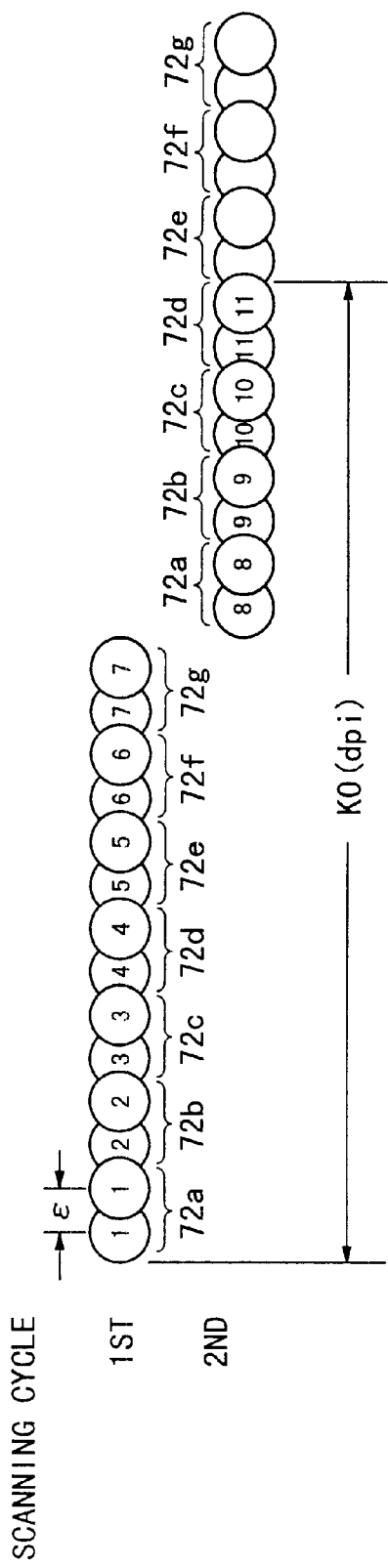

EXPOSURE RECORDING DEVICE FOR SCANNING A RECORDING MEDIUM WITH A LIGHT BEAM

BACKGROUND OF THE INVENTION

1. Field of the Invention:

The present invention relates to an exposure recording apparatus for scanning a recording medium with a light beam from a light source to record an image on the recording medium.

2. Description of the Related Art:

In the art of image recording, there has been used an exposure recording apparatus which records a two-dimensional image on a photosensitive medium mounted on the outer circumferential surface of a drum by rotating the drum about its own axis in a main scanning direction and sweeping a laser beam modulated by image information over the recording medium in an auxiliary scanning direction perpendicular to the main scanning direction.

Different methods are available to record an image at a reduced resolution with the above exposure recording apparatus. According to one method, the size of the spot of the laser beam on the recording medium is increased and the recording pitch in the auxiliary scanning direction is increased. According to another method, the laser beam spot and the recording pitch remain unchanged, and pixels based on the same image information are repeatedly recorded as often as required for the reduced resolution. These methods are reversed for recording an image at an increased resolution with the above exposure recording apparatus.

For increasing or reducing the size of the laser beam spot, it is necessary to actuate a lens in an optical system of the exposure recording apparatus with an actuating mechanism. Therefore, the exposure recording apparatus tends to be large in size, complex in structure, and high in cost. For lowering the resolution by repeatedly recording pixels based on the same image information, the recording speed cannot be increased because the recording pitch is constant in the auxiliary scanning direction.

SUMMARY OF THE INVENTION

It is a general object of the present invention to provide an exposure recording apparatus which is of a simple arrangement and capable of easily changing the resolution of an image to be recorded on a recording medium and recording the image efficiently on the recording medium.

An object of the present invention is to provide an exposure recording apparatus which is capable of increasing the speed to record an image when the resolution of the image is lowered.

Another object of the present invention is to provide an exposure recording apparatus which is relatively small in size and low in cost.

Still another object of the present invention is to provide an exposure recording apparatus which is capable of recording an image efficiently on a recording medium even at a high resolution.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 17 is a diagram of beam spots successively formed on a recording medium when the resolution therefor is one-half that for the beam spots shown in FIG. 16.

DESCRIPTION OF THE PREFERRED EMBODIMENTS

Figure 1:
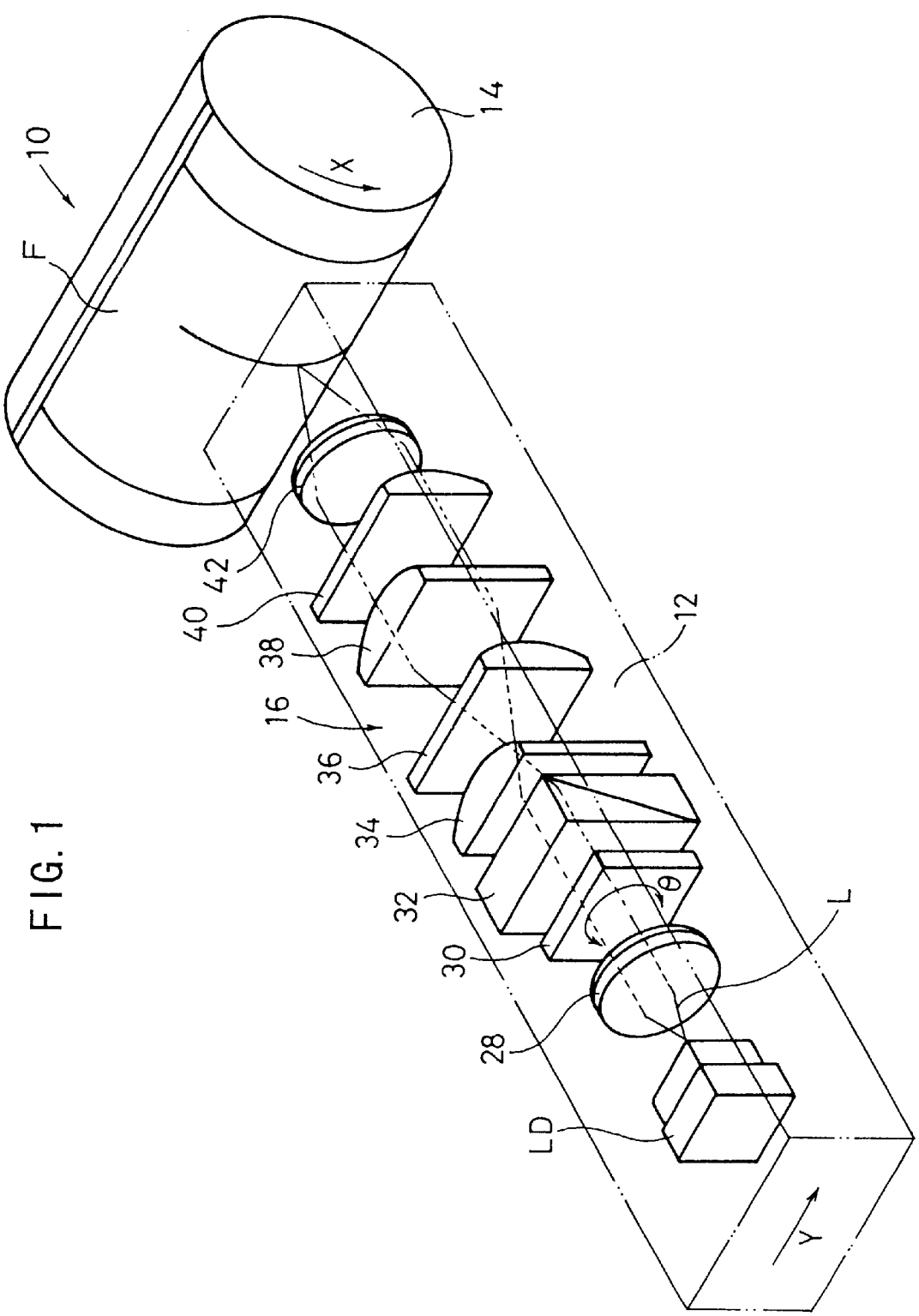
FIG. 1 is a schematic perspective view of a laser recording apparatus according to an embodiment of the present invention.
Figure 2:
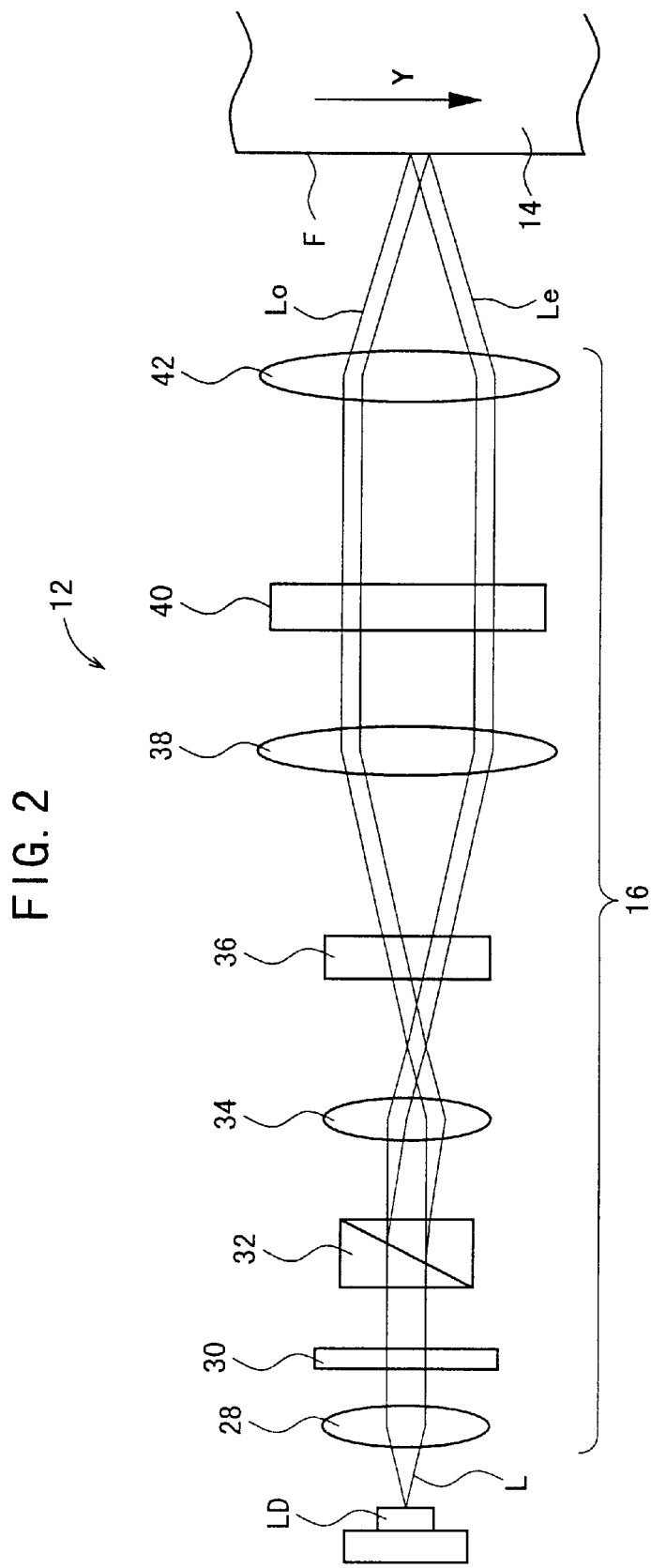
FIG 2. 2 is a plan view of the laser recording apparatus shown in FIG. 1.

FIGS. 1 and 2 show a laser recording apparatus 10 which incorporates an exposure recording apparatus according to an embodiment of the present invention. The laser recording apparatus 10 records an area-modulated image on a recording film F (recording medium) by applying a laser beam L emitted from an exposure head 12 to the recording film F that is mounted on a cylindrical drum 14. The area-modulated image is recorded as a two-dimensional image on the recording film F when the drum 14 rotates about its own axis in the direction indicated by the arrow X (main scanning direction) while the exposure head 12 is moving in the direction indicated by the arrow Y (auxiliary scanning direction). The area-modulated image is an image made up of a plurality of pixels that are produced on the recording film F by turning on and off the laser beam L, the pixels taking up an area representing a certain gradation.

The exposure head 12 comprises a semiconductor laser LD (light source) for emitting the laser beam L of substantially linearly polarized light, and an optical focusing system 16 for focusing the laser beam L onto the recording film F. The semiconductor laser LD may comprise a single transverse mode semiconductor laser capable of emitting a laser beam whose intensity distribution is such that the intensity is highest at the center of the laser beam and gradually lower away from the center of the laser beam. The exposure head 12 may have another light source instead of the semiconductor laser LD insofar as it can emit a light beam having such an intensity distribution.

The optical focusing system 16 comprises a collimator lens 28, a half-wave plate 30 (number-of-focused-spots control means), a polarizing optical element 32 (focused-spots generating means), cylindrical lenses 34, 36, 38, 40, and a condenser lens 42 which are successively arranged in the named order from the semiconductor laser LD. The cylindrical lenses 34, 38 serve as beam-shaping optical elements for focusing the laser beam L only in the auxiliary scanning direction indicated by the arrow Y, and the cylindrical lenses 36, 40 serve as beam-shaping optical elements for focusing the laser beam L only in the main scanning direction indicated by the arrow X.

The half-wave plate 30 adjusts the direction of polarization of the laser beam L which is a substantially linearly polarized beam that has been collimated by the collimator lens 28. The half-wave plate 30 has an optical axis oriented in a direction along the entrance surface of the halfwave plate 30, and can be controlled to rotate in the direction indicated by the arrow θ shown in FIG. 1. The number-of-focused-spots control means may comprise an electro-optic-effect device capable of electrically controlling the direction of polarization of the laser beam L, rather than the half-wave plate 30.

Figure 3:
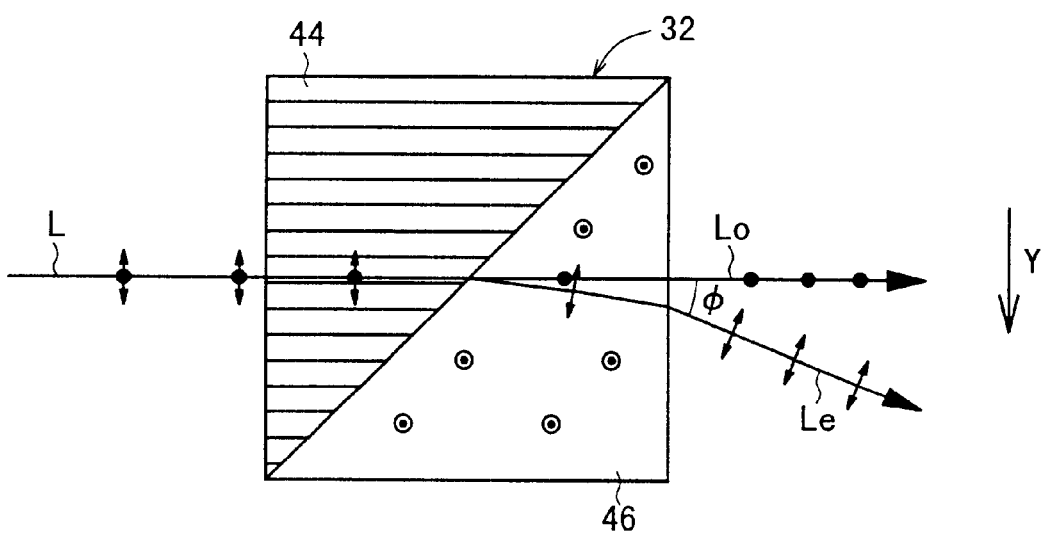
FIG. 3 is a view illustrative of the manner in which a polarizing optical element shown in FIG. 2 operates.

The polarizing optical element 32 comprises a Rochon prism having two bonded uniaxial crystals 44, 46 whose optical axes extend perpendicularly to each other. The polarizing optical element 32 serves to separate the laser beam L into an ordinary ray Lo and an extraordinary ray Le with respect to the auxiliary scanning direction indicated by the arrow Y. As shown in FIG. 3, the uniaxial crystal 44, which is positioned on an entrance side of the polarizing optical element 32, has an optical axis extending parallel to the optical axis of the laser beam L, and the uniaxial crystal 46, which is positioned on an exit side of the polarizing optical element 32, has an optical axis extending perpendicularly to the optical axis of the laser beam L and the auxiliary scanning direction indicated by the arrow Y. The ordinary ray Lo travels straight through the polarizing optical element 32, and the extraordinary ray Le is diffracted in the auxiliary scanning direction indicated by the arrow Y by the polarizing optical element 32.

The polarizing optical element 32 may instead comprise a Wollaston prism having two bonded uniaxial crystals 44, 46, the uniaxial crystal 44 having an optical axis which extends perpendicularly to the optical axis of the laser beam L and parallel to the auxiliary scanning direction indicated by the arrow Y, and the uniaxial crystal 46 having an optical axis which extends perpendicularly to the optical axis of the laser beam L and the auxiliary scanning direction indicated by the arrow Y.

The polarizing optical element 32 is not necessarily required to separate the laser beam L into an ordinary ray Lo and an extraordinary ray Le, but only needs to separate the laser beam L into two rays of light which are polarized in different directions.

Figure 4:
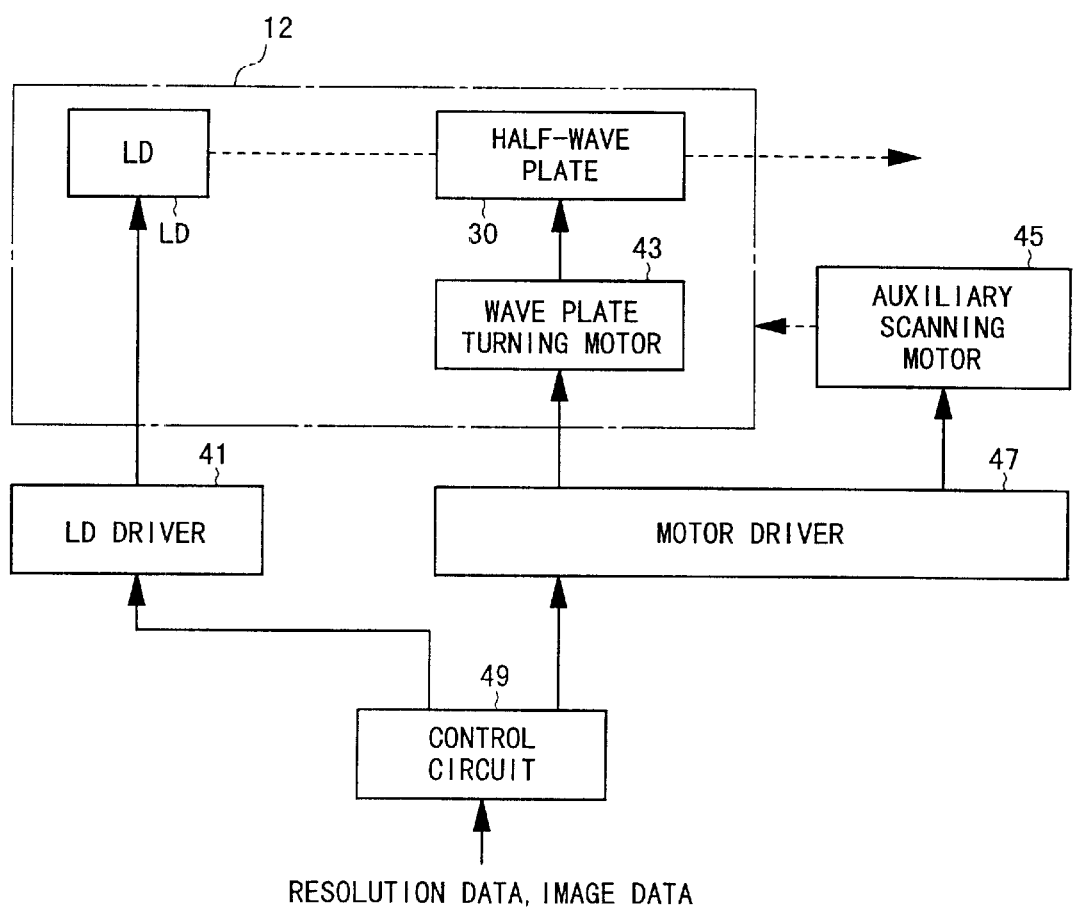
FIG. 4 is a block diagram of a control system for the laser recording apparatus shown in FIG. 1.

A control system for the laser recording apparatus 10 is shown in FIG. 4. As shown in FIG. 4, the control system comprises an LD driver 41 for energizing a semiconductor laser LD according to image data, a wave plate turning motor 43 for angularly moving the half-wave plate 30, an auxiliary scanning motor 45 for moving the exposure head 12 in the auxiliary scanning direction indicated by the arrow Y, a motor driver 47 (auxiliary scanning control means) for energizing the wave plate turning motor 43 and the auxiliary scanning motor 45, and a control circuit 49 for controlling the LD driver 41 and the motor driver 47. The control circuit 49 is supplied with image data and resolution data of an image to be recorded on the recording film F.

Figure 5:
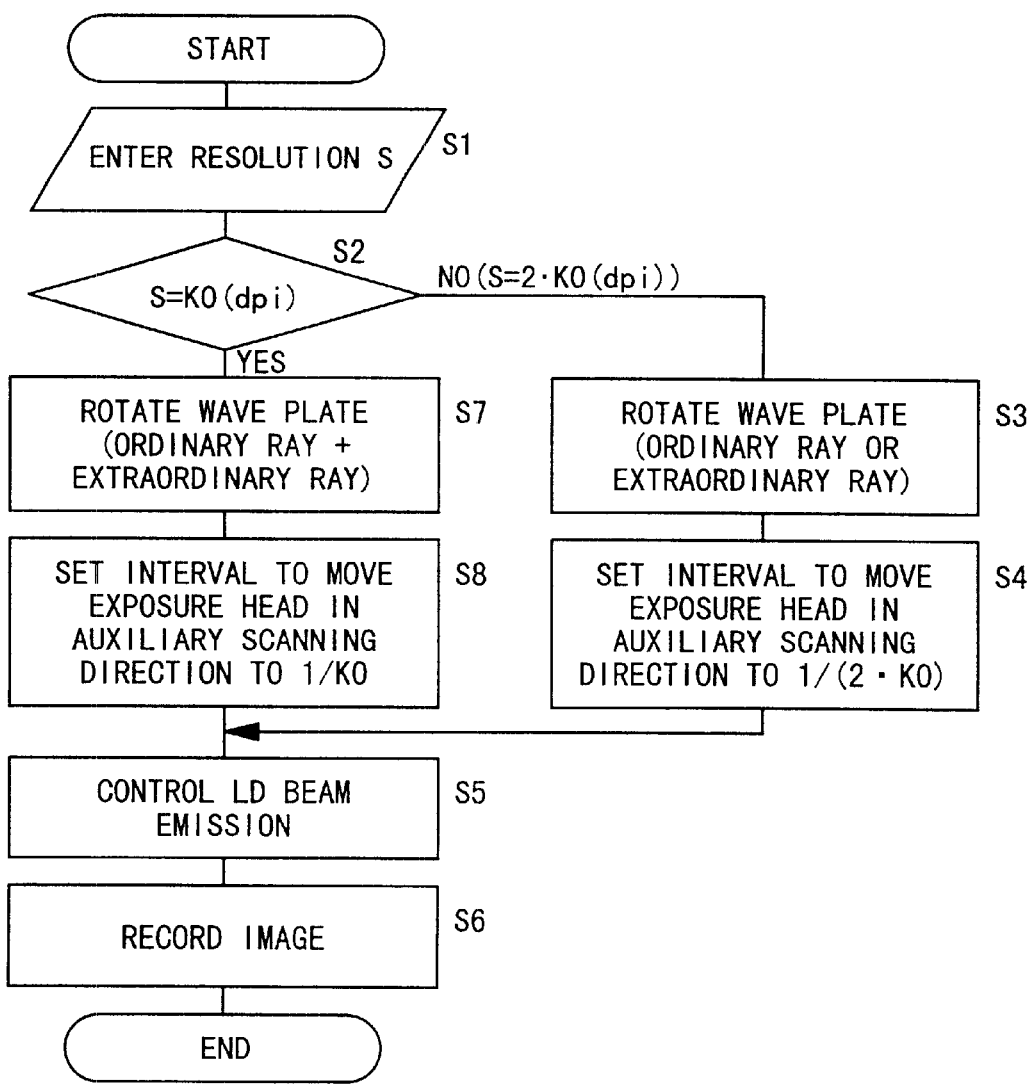
FIG. 5 is a flowchart of a processing sequence for recording an image depending on an indicated resolution.

The laser recording apparatus 10 is basically constructed as described above. Operation and advantages of the laser recording apparatus 10 will be described below with reference to the flowchart shown in FIG. 5.

The operator enters a resolution S of an image to be recorded into the laser recording apparatus 10 in step S1. Resolution data relative to the resolution S and image data are supplied to the control circuit 49, which supplies a signal adjusted according to the resolution and image data to the LD driver 41 and the motor driver 47. It is assumed that the laser recording apparatus 10 is capable of recording images at two resolutions K0 (dpi) and 2·K0 (dpi).

If the entered resolution S is 2·K0 (dpi) in step S2, then the motor driver 47 energizes the wave plate turning motor 43 to angularly move the half-wave plate 30 for emitting only the ordinary ray Lo from the polarizing optical element 32 in step S3. The motor driver 47 then sets an interval at which to move the exposure head 12 in the auxiliary scanning direction indicated by the arrow Y with the auxiliary scanning motor 45, to 1/(2·K0) in step S4.

Specifically, if the direction of polarization of the laser beam L with respect to the optical axis of the half-wave plate 30 is θ, then the direction of polarization of the laser beam L which has passed through the half-wave plate 30 is −θ. Therefore, when the half-wave plate 30 is controlled to rotate about its own optical axis, the laser beam L which is polarized in any arbitrary direction can be applied to the polarizing optical element 32. If the direction of polarization of the laser beam L applied to the polarizing optical element 32 is aligned with the optical axis of the uniaxial crystal 46, then the polarizing optical element 32 emits only the ordinary ray Lo. Therefore, when the half-wave plate 30 is turned to bring the direction of polarization of the laser beam L into alignment with the optical axis of the uniaxial crystal 46, only the ordinary ray Lo is emitted from the polarizing optical element 32.

The half-wave plate 30 may be replaced with two quarter-wave plates. After the laser beam L which is substantially linearly polarized light is converted into a circularly polarized beam by the front quarter-wave plate, the circularly polarized beam may be converted into a linearly polarized beam having an arbitrary direction of polarization by the rear quarter-wave plate that is controlled to rotate about its own optical axis, and the linearly polarized beam may be applied to the polarizing optical element 32. If the laser beam L supplied to the focusing optical system 16 is substantially circularly polarized light or randomly polarized light, then a single quarter-wave plate may be used and controlled in its angular motion to obtain a linearly polarized beam having an arbitrary direction of polarization from the supplied laser beam L.

Thereafter, the LD driver 41 energizes the semiconductor laser LD depending on the supplied image data in step S5. The laser beam L emitted from the semiconductor laser LD is converted by the collimator lens 28 into a parallel beam which is applied to the half-wave plate 30. When the laser beam L, which is a substantially linearly polarized beam, is applied to the half-wave plate 30, the direction of polarization of the laser beam L is brought into alignment with the optical axis of the uniaxial crystal 46 of the polarizing optical element 32. Then, the laser beam L is applied to the polarizing optical element 32.

When the laser beam L is applied to the polarizing optical element 32, only the ordinary ray Lo passes through the polarizing optical element 32 along the optical axis thereof. The ordinary ray Lo is shaped in the auxiliary scanning direction indicated by the arrow Y by the cylindrical lenses 34, 38, and also shaped in the main scanning direction indicated by the arrow X by the cylindrical lenses 36, 40. Thereafter, the ordinary ray Lo is focused onto the recording film F on the drum 14 by the condenser lens 42.

Figure 6:
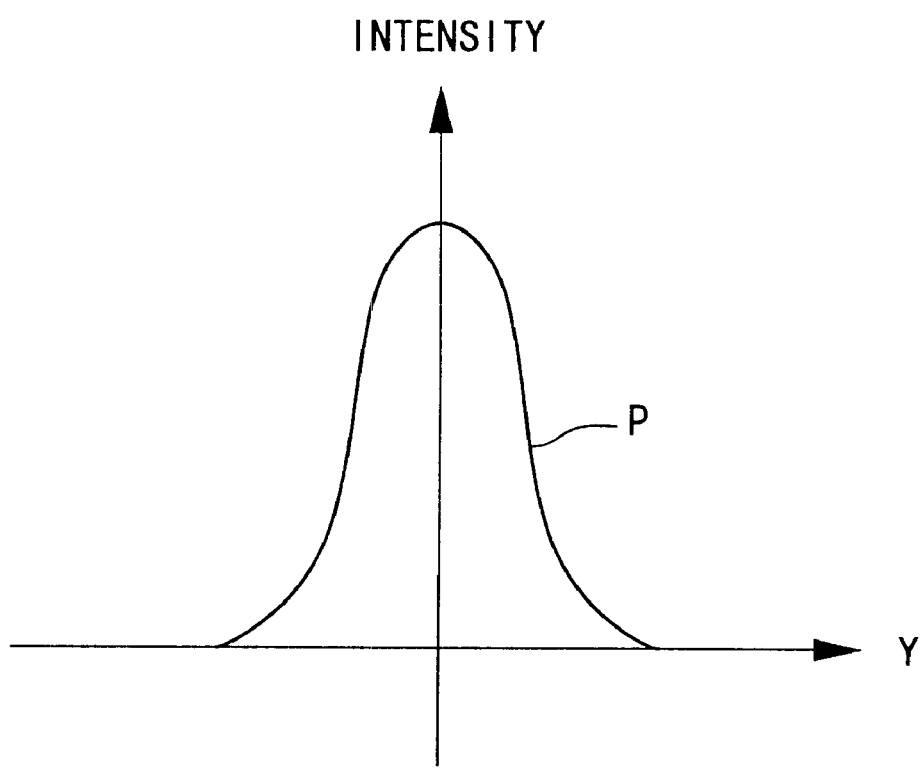
FIG. 6 is a diagram of the intensity distribution of a laser beam with a single focused point.
Figure 8:
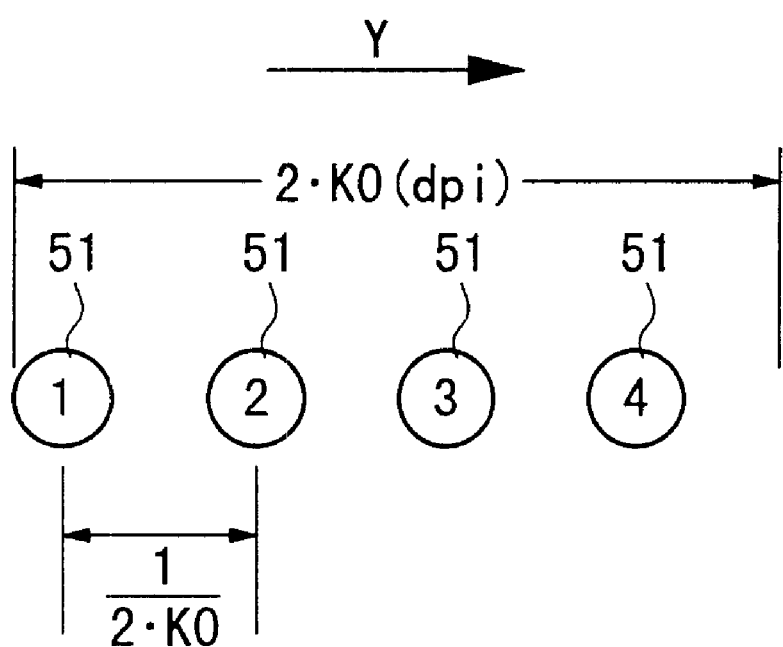
FIG. 8 is a diagram of beam spots successively formed on a recording medium by the laser beam with the single focused point.

On the recording film F, a beam spot 51 (see FIG. 8) having an intensity distribution P shown in FIG. 6 is formed by the ordinary ray Lo. When the exposure head 12 is fed at the pitch of $1/(2 \cdot K0)$ in the auxiliary scanning direction indicated by the arrow Y and the drum 14 is rotated in the main scanning direction indicated by the arrow X, beam spots 51 are successively formed to produce a two-dimensional image on the recording medium F at the resolution $S = 2 \cdot K0$ (dpi).

If the resolution S is changed from $2 \cdot K0$ (dpi) to K0 (dpi) in step S2, then the motor driver 47 energizes the wave plate turning motor 43 to angularly move the half-wave plate 30 for emitting both the ordinary ray Lo and the extraordinary ray Le at equal intensities from the polarizing optical element 32 in step S7. The motor driver 47 then sets an interval at which to move the exposure head 12 in the auxiliary scanning direction indicated by the arrow Y with the auxiliary scanning motor 45, to 1/K0 in step S8.

Specifically, the half-wave plate 30 is rotated about its own optical axis to adjust the direction of polarization of the laser beam L to about 45° with respect to the optical axis of the uniaxial crystal 46. In the uniaxial crystal 44, the laser beam L is not separated into an ordinary ray Lo and an extraordinary ray Le as the laser beam L travels along the optical axis of the uniaxial crystal 44. In the uniaxial crystal 46, however, since the laser beam L travels in the direction perpendicular to the optical axis of the uniaxial crystal 46 which is perpendicular to the auxiliary scanning direction indicated by the arrow Y, the laser beam L is separated into an ordinary ray Lo which travels straight along the optical axis of the uniaxial crystal 46 and an extraordinary ray Le which is diffracted a certain angle φ in the auxiliary scanning direction indicated by the arrow Y. Because the direction of polarization of the laser beam L is set to about 45° with respect to the optical axis of the uniaxial crystal 46, the ordinary ray Lo and the extraordinary ray Le are adjusted to the same intensity. The angle φ through which the extraordinary ray Le is diffracted can be adjusted by selecting the thickness of the polarizing optical element 32 along the optical axis of the laser beam L and the material of the polarizing optical element 32.

Thereafter, the LD driver 41 energizes the semiconductor laser LD depending on the supplied image data in step S5. The direction of polarization of the laser beam L emitted from the semiconductor laser LD is adjusted by the halfwave plate 30, after which the laser beam L is separated into an ordinary ray Lo and an extraordinary ray Le by the polarizing optical element 32. Then, the ordinary ray Lo and the extraordinary ray Le which have passed through the polarizing optical element 32 are shaped in the auxiliary scanning direction indicated by the arrow Y by the cylindrical lenses 34, 38, and also shaped in the main scanning direction indicated by the arrow X by the cylindrical lenses 36, 40. Thereafter, the ordinary ray Lo and the extraordinary ray Le are focused onto the recording film F on the drum 14 by the condenser lens 42.

Figure 7:
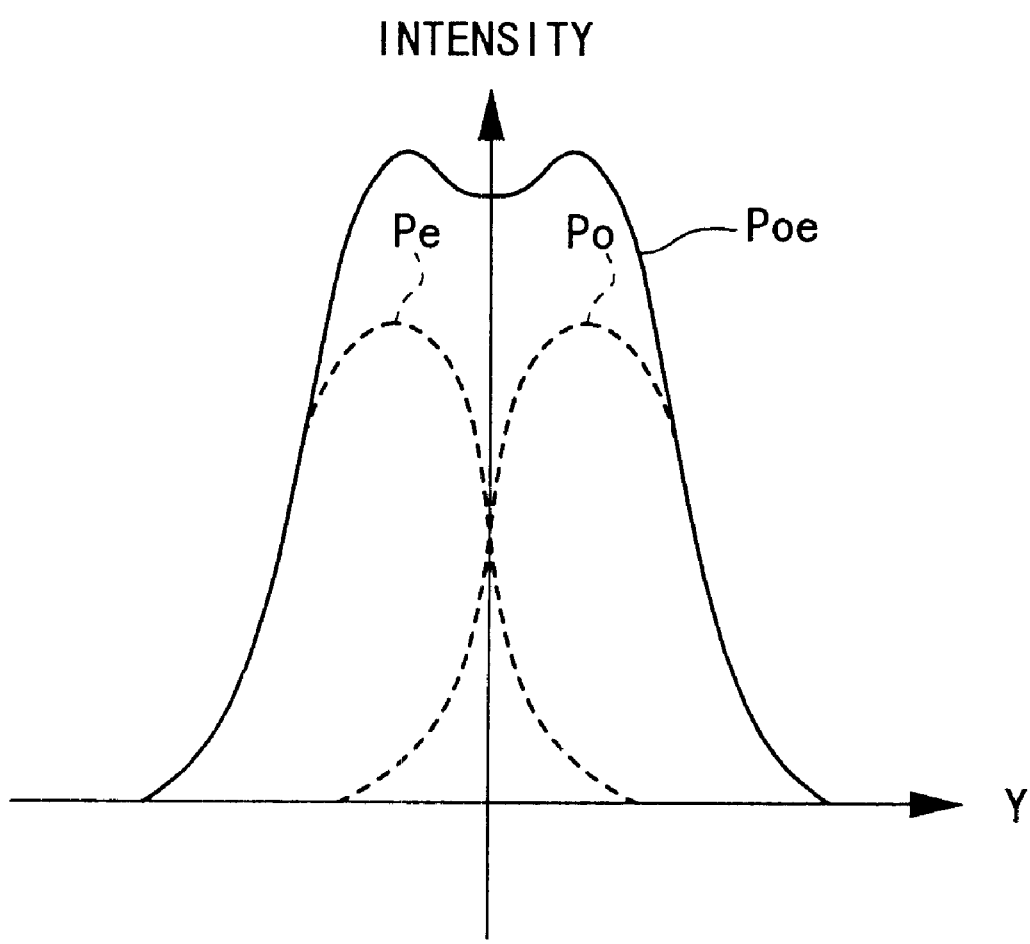
FIG. 7 is a diagram of the intensity distribution of a laser beam with two focused points.

On the recording film F, as shown in FIG. 7, an intensity distribution Po of the ordinary ray Lo and an intensity distribution Pe of the extraordinary ray Le are combined in the auxiliary scanning direction indicated by the arrow Y, producing an intensity distribution Poe. Since the laser beam L is divided equally into the ordinary ray Lo and the extraordinary ray Le by the polarizing optical element 32, the intensity distribution Poe is lower in intensity than the intensity distribution of the ordinary ray Lo only. The LD driver 41 adjusts the output power of the semiconductor laser LD in view of the lower intensity of the intensity distribution Poe.

Figure 9:
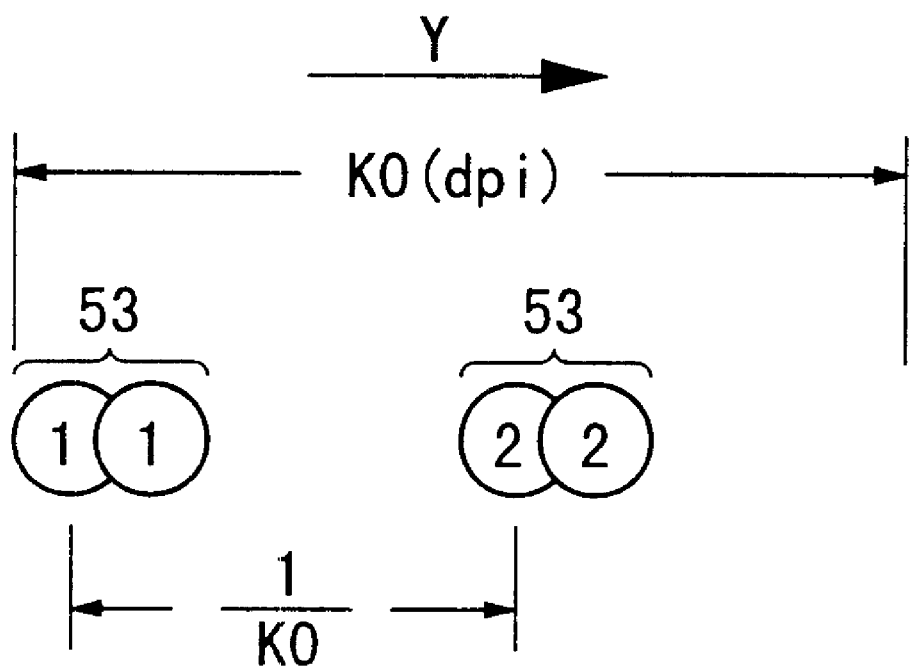
FIG. 9 is a diagram of beam spots successively formed on a recording medium by the laser beam with the two focused points.

As shown in FIG. 9, when the exposure head 12 is fed at the pitch of 1/K0 in the auxiliary scanning direction indicated by the arrow Y and the drum 14 is rotated in the main scanning direction indicated by the arrow X, beam spots 53 each having the intensity distribution Poe are successively formed to produce a two-dimensional image on the recording medium F at the resolution S=K0 (dpi) in step S6.

As described above, when the resolution S is changed from $2 \cdot K0$ (dpi) to K0 (dpi), the beam spot 51 (see FIG. 8) can easily be enlarged into the beam spot 53 (see FIG. 9) simply by adjusting the angular displacement of the half-wave plate 30. Since the scanning speed in the auxiliary scanning direction is increased, the image can be recorded at an increased speed.

Similarly, the resolution S can be changed from K0 (dpi) to $2 \cdot K0$ (dpi).

Figure 10:
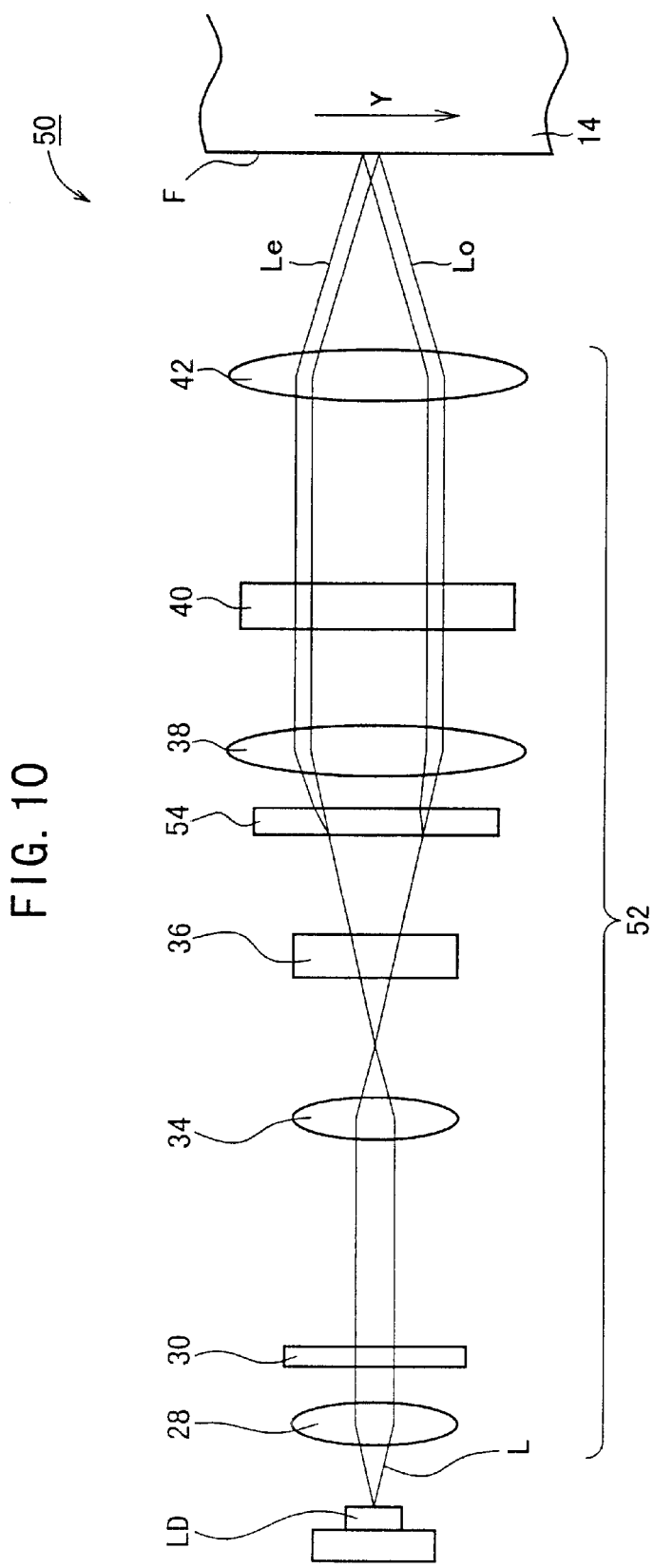
FIG. 10 is a plan view of a laser recording apparatus according to another embodiment of the present invention.

FIG. 10 shows a laser recording apparatus 50 according to another embodiment of the present invention. Those parts of the laser recording apparatus 50 which are identical to those of the laser recording apparatus 10 shown in FIGS. 1 and 2 are denoted by identical reference characters, and will not be described in detail below.

The laser recording apparatus 50 has an optical focusing system 52 which is different from the optical focusing system 16 shown in FIGS. 1 and 2 in that the polarizing optical element 32 is dispensed with and a polarizing optical element 54 comprising a uniaxial crystal is disposed in an area where the laser beam L is diverged between the cylindrical lenses 36, 38. The polarizing optical element 54 has an optical axis oriented between the optical axis of the laser beam L and the auxiliary scanning direction indicated by the arrow Y. The polarizing optical element 54 may be positioned in an area where the laser beam L is converged between the condenser lens 42 and the recording film F.

Figure 11:
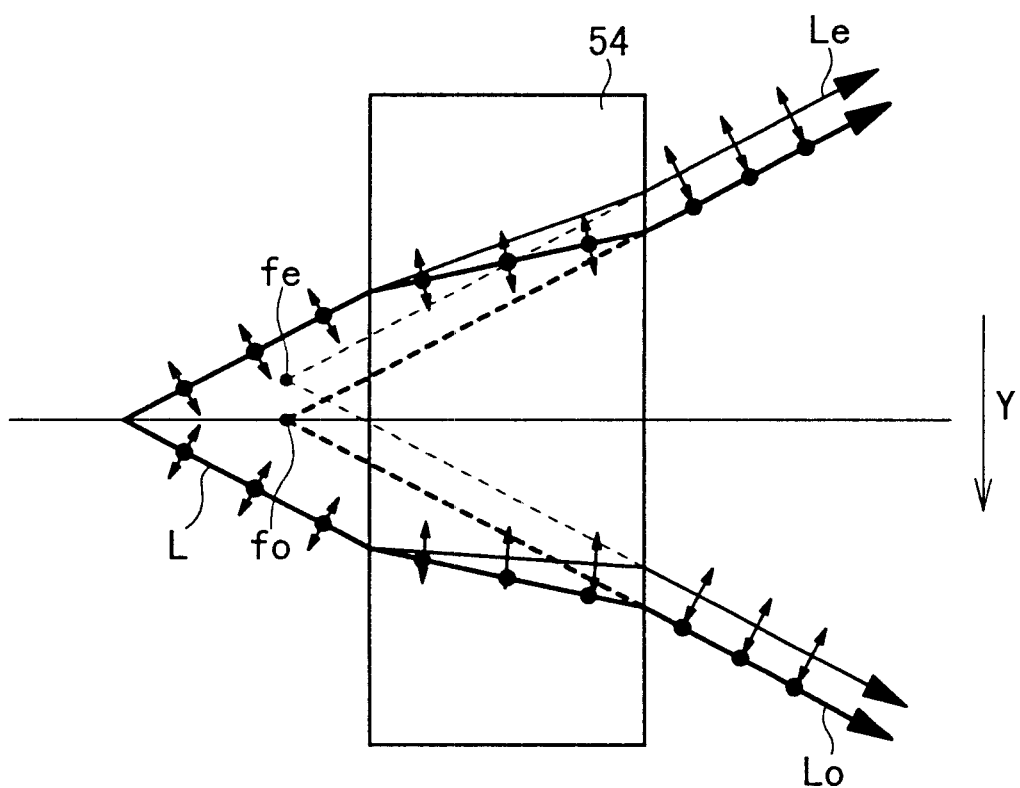
FIG. 11 is a view illustrative of the manner in which a uniaxial crystal shown in FIG. 10 operates.

When the resolution S is set to K0 (dpi), the laser beam L whose direction of polarization has been adjusted by the half-wave plate 30 and which has been diverged in the auxiliary scanning direction indicated by the arrow Y by the cylindrical lens 34 is separated into an ordinary ray Lo and an extraordinary ray Le by the polarizing optical element 54, as shown in FIG. 11. Since the refractive index of the polarizing optical element 54 with respect to the ordinary ray Lo is constant irrespective of the direction of the optical axis, the ordinary ray Lo is emitted from a virtual emission point fo on the optical axis of the laser beam L, and led to the cylindrical lens 38. The refractive index of the polarizing optical element 54 with respect to the extraordinary ray Le differs depending on the direction in which the laser beam L is applied and the direction of the optical axis thereof, and the optical axis of the polarizing optical element 54 is oriented between the optical axis of the laser beam L and the auxiliary scanning direction indicated by the arrow Y.

Therefore, the extraordinary ray Le is emitted from a virtual emission point fe that is displaced a certain distance from the optical axis of the laser beam L in the auxiliary scanning direction indicated by the arrow Y, and led to the cylindrical lens 38.

As a result, the ordinary ray Lo and the extraordinary ray Le are focused by the cylindrical lenses 38, 40 and the condenser lens 42 onto the recording film F at respective positions that are displaced a certain distance in the auxiliary scanning direction indicated by the arrow Y. The focused spots of the ordinary ray Lo and the extraordinary ray Le jointly provide the intensity distribution Poe shown in FIG. 7. An image having the resolution S=K0 (dpi) can thus be formed using the enlarged beam spot.

For forming an image having the resolution S=2·K0 (dpi), the direction of polarization of the laser beam L may be set to a direction perpendicular to the auxiliary scanning direction indicated by the arrow Y by the half-wave plate 30 for thereby achieving the intensity distribution P shown in FIG. 6.

Figure 12:
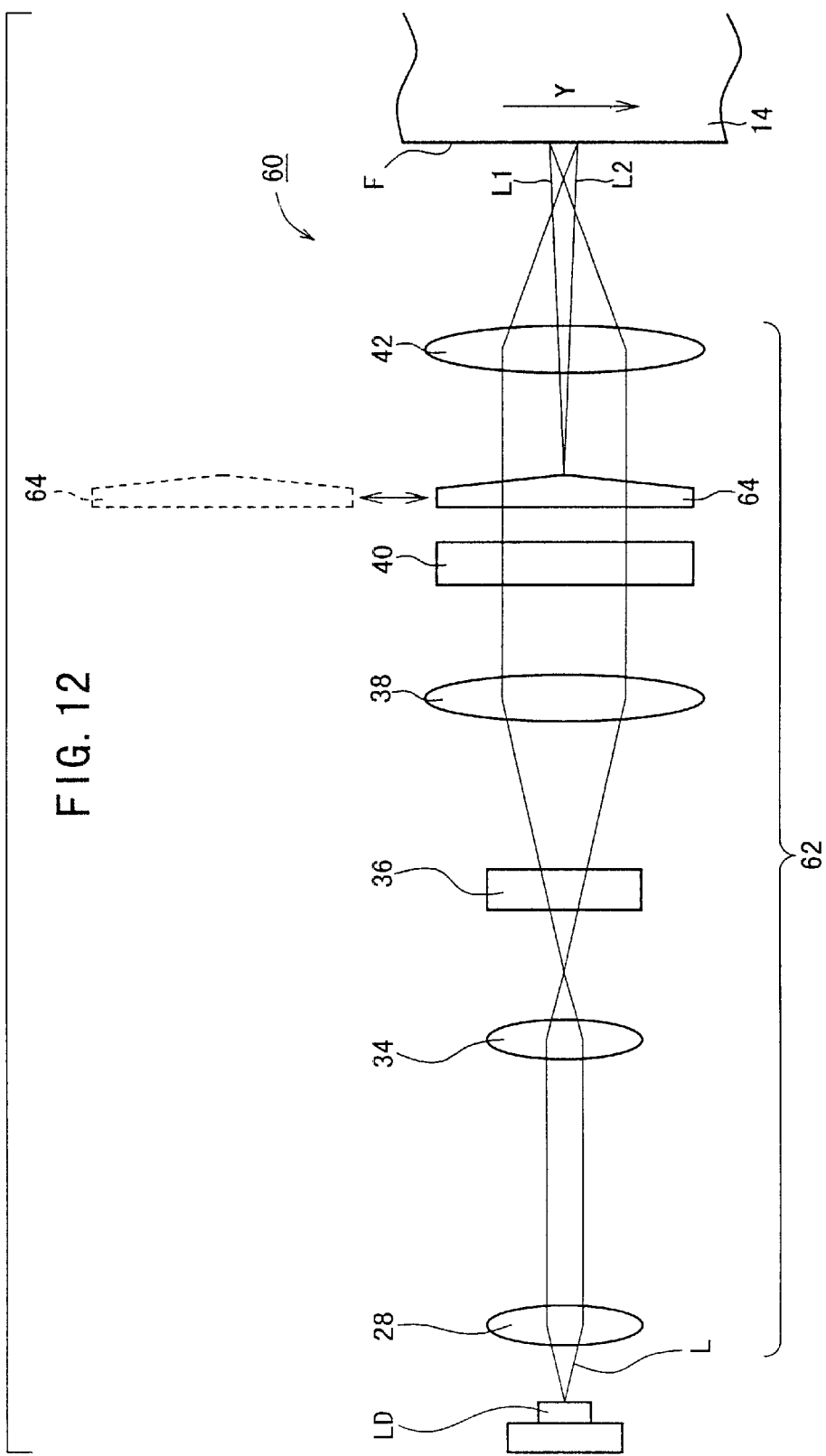
FIG. 12 is a plan view of a laser recording apparatus according still another embodiment of the present invention.

FIG. 12 shows a laser recording apparatus 60 according to still another embodiment of the present invention. Those parts of the laser recording apparatus 60 which are identical to those of the laser recording apparatus 10 shown in FIGS. 1 and 2 are denoted by identical reference characters, and will not be described in detail below.

Figure 13:
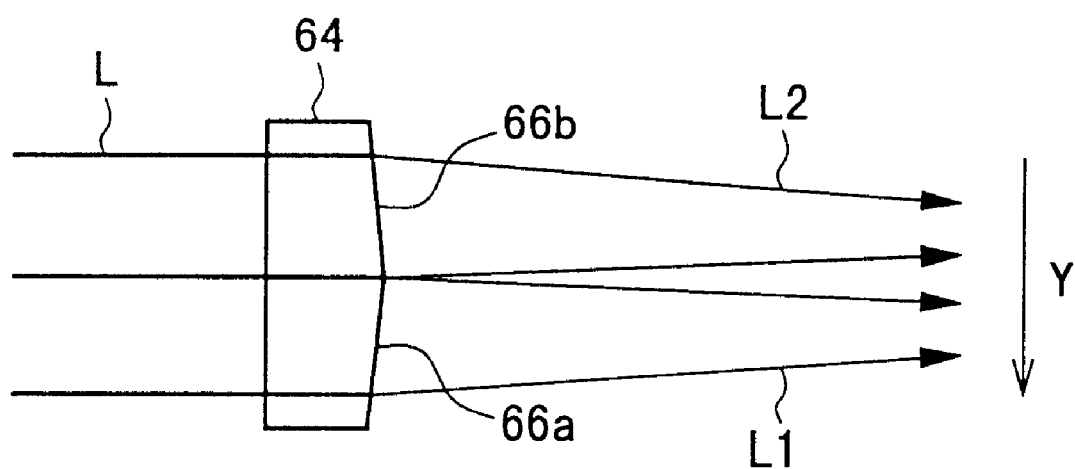
FIG. 13 is a view illustrative of the manner in which a prism shown in FIG. 12 operates.

The laser recording apparatus 60 has an optical focusing system 62 which is different from the optical focusing system 16 shown in FIGS. 1 and 2 in that the half-wave plate 30 and the polarizing optical element 32 are dispensed with and a prism 64 is disposed between the cylindrical lens 40 and the condenser lens 42. As shown in FIG. 13, the prism 64 has two exit surfaces 66a, 66b slanted symmetrically from the optical axis of the laser beam L in the auxiliary scanning direction indicated by the arrow Y.

The laser beam L applied to the prism 64 is refracted by the exit surfaces 66a, 66b and emitted therefrom as two laser beams L1, L2 that are spaced from each other in the auxiliary scanning direction indicated by the arrow Y. The laser beams L1, L2 are then led to the recording film F where their focused spots jointly provide the intensity distribution Poe shown in FIG. 7. The prism 64 may have two slanted entrance surfaces instead of the exit surfaces 66a, 66b. The exist surfaces 66a, 66b or the entrance surfaces of the prism 64 may be slanted in any way insofar as they are slanted symmetrically with respect to the optical axis of the prism 64. For example, the prism 64 may be constructed as a concave lens. The laser beam: L thus divided into two laser beams is capable of forming an image having the resolution S=K0 (dpi).

For forming an image having the resolution S=2·K0 (dpi), the prism 64 may be retracted out of the path of the laser beam L by a displacement control means, as indicated by the broken line in FIG. 12, to achieve the intensity distribution P shown in FIG. 6.

Figure 14:
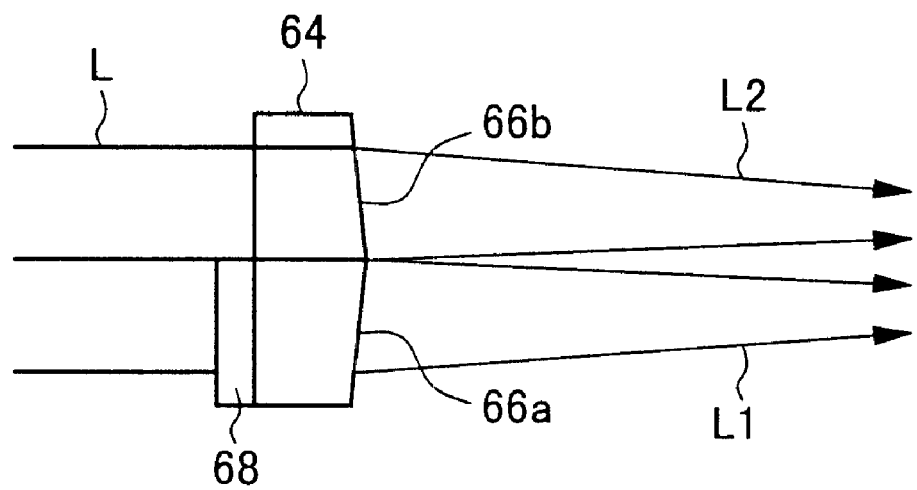
FIG. 14 is a view illustrative of the manner in which the prism shown in FIG. 12 combined with a half-wave plate operates.

FIG. 14 shows the prism 64 shown in FIG. 13 and a halfwave plate 68 disposed on a side of the entrance surface of the prism 64 where the laser beam L1 is generated. The optical axis of the half-wave plate 68 is inclined 45° to the direction of polarization of the laser beam L which is a substantially linearly polarized beam, so that the direction of polarization of the laser beam L1 is angularly spaced 90° from the direction of polarization of the laser beam L2. Therefore, for achieving the intensity distribution Poe, the laser beams L1, L2 do not interfere with each other on the recording film F, and the intensity distribution is of a rectangular shape with respect to the auxiliary scanning direction indicated by the arrow Y.

In the above embodiments, an image is recorded using a single semiconductor laser LD. The resolution can also be changed in a multi-beam laser recording apparatus which employs a plurality of semiconductor lasers LD to record a plurality of pixels at the same time.

Figure 15:
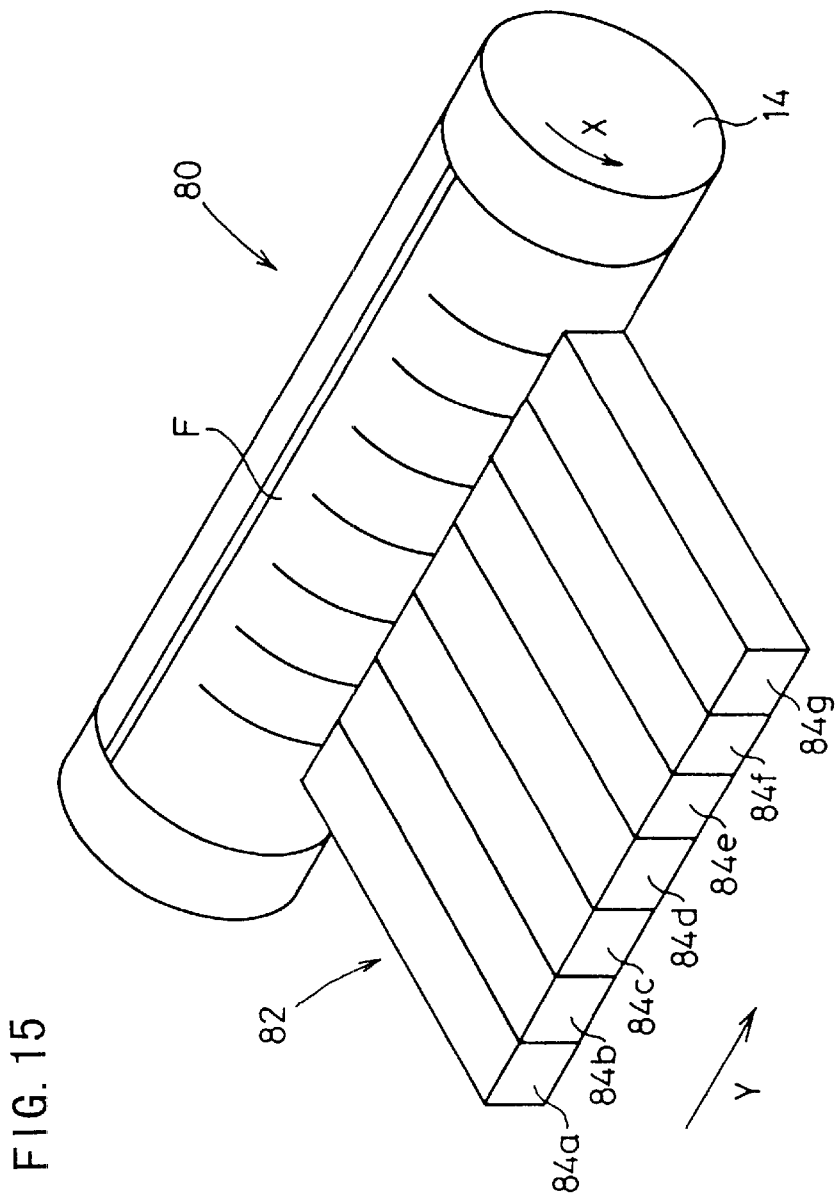
FIG. 15 is a perspective view of a multi-beam laser recording apparatus according to an embodiment of the present invention.

FIG. 15 shows a multi-beam laser recording apparatus 80 according to an embodiment of the present invention. Those parts of the laser recording apparatus 80 which are identical to those of the laser recording apparatus 10 shown in FIG. 1 are denoted by identical reference characters, and will not be described in detail below.

The laser recording apparatus 80 records an area modulated image on the recording film F by applying a laser beam emitted from an exposure head 82 to the recording film F that is mounted on the cylindrical drum 14. The exposure head 82 comprises a plurality of (seven in the illustrated embodiment) exposure units 84a–84g for emitting respective laser beams. Each of the exposure units 84a–84g is identical in structure to the exposure head 12 of the laser recording apparatus 10. In the laser recording apparatus 80, the laser beams emitted from the respective exposure units 84a–84g are applied to the recording film F, forming an image composed of simultaneous main scanning lines.

A process of changing resolutions with the laser recording apparatus 80 will be described below with reference to FIGS. 16 and 17.

Figure 16:
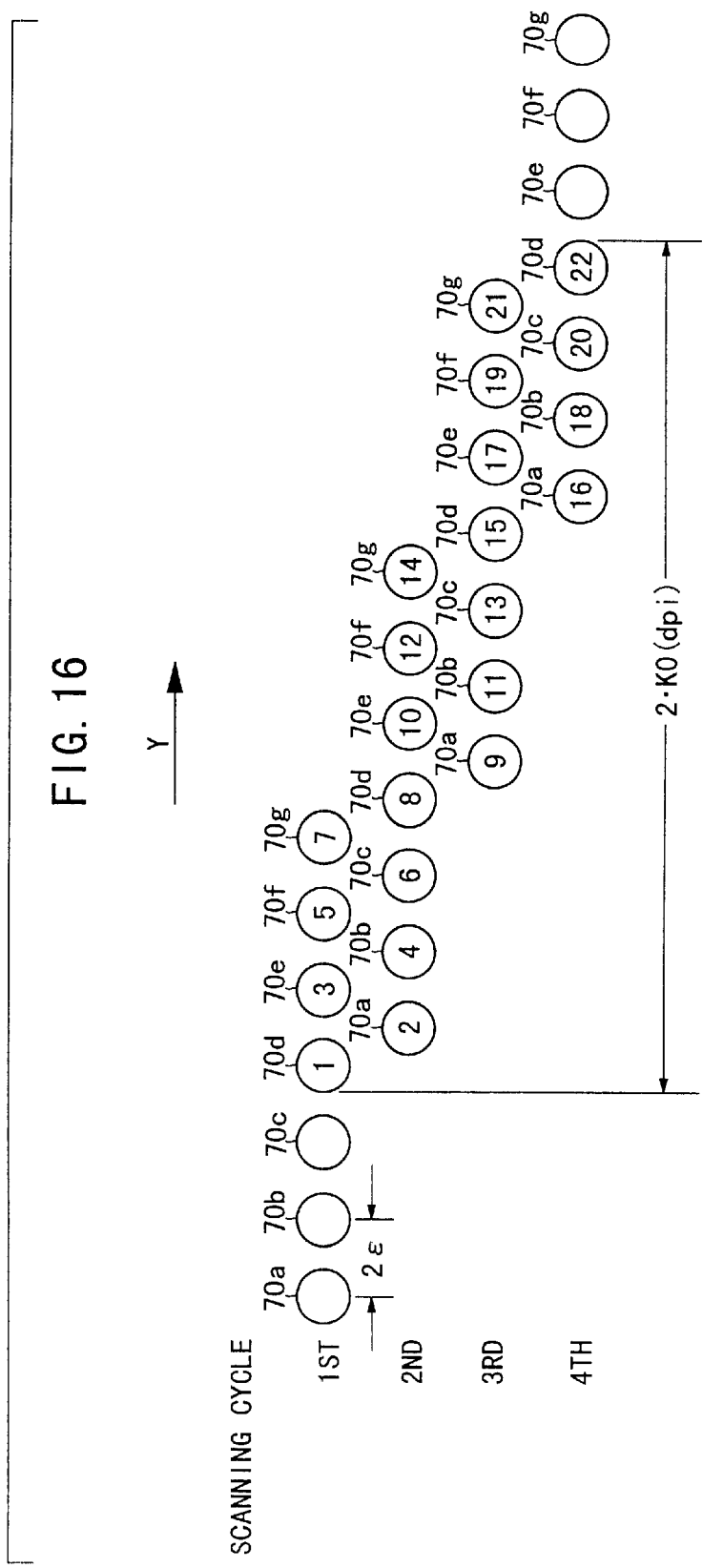
FIG. 16 is a diagram of beam spots successively formed on a recording medium by the multi-beam laser recording apparatus shown in FIG. 15.

FIG. 16 illustrates the manner in which an image having the resolution S=2·K0 (dpi) is recorded by the exposure head 82 (see FIG. 15) which is capable of simultaneously forming seven beam spots 70a–70g adjacent two of which are spaced at an interval of 2ϵ. In each of successive auxiliary scanning cycles, the stroke of the exposure head 82 overlaps half the stroke thereof in the preceding scanning cycle in the auxiliary scanning direction indicated by the arrow Y, and the spaces between the preceding main scanning lines are scanned by the main scanning lines.

When the resolution S is changed to K0 (dpi), as shown in FIG. 17, each of focused beam spots 70a–70g is displaced a distance ϵ in the auxiliary scanning direction indicated by the arrow Y by the focused-spots generating means such as the polarizing optical element 32, forming beam spots 72a–72g each composed of two focused spots, and the exposure head 82 is controlled to move in strokes that do not overlap each other in successive auxiliary scanning cycles. In this manner, the beam size can be increased depending on the resolution S, and an image can be recorded in a number of scanning cycles that is half the number of scanning cycles for the resolution S=2·K0 (dpi).

In the above embodiments, if the resolution S is to be reduced to one half, then the laser beam L is separated into the ordinary ray Lo and the extraordinary ray Le. However, the resolution S may be changed otherwise. For example, if two polarizing optical elements 54 are employed to divide the laser beam L into four beams, then the resolution S can easily be reduced to one quarter. Moreover, if the positions of a plurality of focused spots of the laser beam L are adjusted with respect to the auxiliary scanning direction indicated by the arrow Y, then the resolution S may be adjusted to any arbitrary value. In addition, the optical focusing system 16 is not limited to the illustrated optical system.

Although certain preferred embodiments of the present invention have been shown and described in detail, it should be understood that various changes and modifications may be made therein without departing from the scope of the appended claims.

What is claimed is:

1. An exposure recording apparatus comprising:
   a light source for emitting a light beam;
   a recording medium for recording an image thereon upon being scanned by the light beam from said light source;
   an optical focusing system for focusing the light beam from said light source and guiding the focused light beam to said recording medium;
   focused-spots generating means for dividing said light beam into a plurality of light beams and enabling said optical focusing system to generate a plurality of focused spots in an auxiliary scanning direction on said recording medium from said plurality of light beams;
   number-of-focused-spots control means for controlling the number of focused spots generated by said focused-spots generating means depending on the resolution of the image to be recorded on said recording medium; and
   auxiliary scanning control means for controlling recorded intervals in said auxiliary scanning direction depending on said resolution.

2. An exposure recording apparatus according to claim 1, wherein said focused-spots generating means comprises a polarizing optical element for separating said light beam into two light beams which are polarized in different directions.

3. An exposure recording apparatus according to claim 2, wherein said polarizing optical element separates said light beam into an ordinary ray and an extraordinary ray.

4. An exposure recording apparatus according to claim 3, wherein said polarizing optical element comprises a Rochon prism.

5. An exposure recording apparatus according to claim 3, wherein said polarizing optical element comprises a Wollaston prism.

6. An exposure recording apparatus according to claim 2, wherein said polarizing optical element is disposed in an area where said light is converted into a substantially parallel beam, for emitting said two light beams which are polarized in different directions at different angles, respectively.

7. An exposure recording apparatus according to claim 2, wherein said polarizing optical element is disposed in an area where said light is diverged or converged, for emitting said two light beams which are polarized in different directions from different positions, respectively, in said auxiliary scanning direction.

8. An exposure recording apparatus according to claim 2, wherein said polarizing optical element comprises a uniaxial crystal.

9. An exposure recording apparatus according to claim 2, wherein said number-of-focused-spots control means comprises an electro-optic-effect device disposed between said light source and said polarizing optical element, for controlling the direction of polarization of the light beam applied to said polarizing optical element depending on said resolution for thereby controlling the number of focused spots.

10. An exposure recording apparatus according to claim 1, wherein said focused-spots generating means comprises a prism having a vertex positioned on the optical axis of said light beam, for dividing said light beam symmetrically with respect to the optical axis thereof in said auxiliary scanning direction.

11. An exposure recording apparatus according to claim 10, wherein said focused-spots generating means further comprises a half-wave plate disposed on one of sides of said prism which are symmetrical with respect to the optical axis of the light beam in said auxiliary scanning direction.

12. An exposure recording apparatus according to claim 1, wherein said auxiliary scanning control means comprises a motor for controlling the speed of movement of said optical focusing system in said auxiliary scanning direction depending on said resolution.

13. An exposure recording apparatus according to claim 1, wherein said light source comprises a plurality of light sources arrayed in said auxiliary scanning direction.

14. The exposure recording apparatus of claim 1, further comprising a first cylindrical lens which serves as a beam-shaping optical element for focusing said light beam in the auxiliary scanning direction, and a second cylindrical lens which serves as a beam shaping optical element for focusing said light beam in a main scanning direction, said first and said second cylindrical lenses disposed between said number-of-focused-spots control means and said recording medium.

15. An exposure recording apparatus comprising:
   a light source for emitting a light beam;
   a recording medium for recording an image thereon upon being scanned by the light beam from said light source;
   an optical focusing system for focusing the light beam from said light source and guiding the focused light beam to said recording medium;
   focused-spots generating means for dividing said light beam into a plurality of light beams and enabling said optical focusing system to generate a plurality of focused spots in an auxiliary scanning direction on said recording medium from said plurality of light beams;
   number-of-focused-spots control means for controlling the number of focused spots generated by said focused-spots generating means depending on the resolution of the image to be recorded on said recording medium; and
   auxiliary scanning control means for controlling recorded intervals in said auxiliary scanning direction depending on said resolution,
      wherein said focused-spots generating means comprises a prism having a vertex positioned on the optical axis of said light beam, for dividing said light beam symmetrically with respect to the optical axis thereof in said auxiliary scanning direction, and
      wherein said number-of-focused-spots control means comprises displacement control means for displacing said focused-spots generating means selectively into and out of a path of said light beam.

16. An exposure recording apparatus comprising:
   a light source for emitting a light beam;
   a recording medium for recording an image thereon upon being scanned by the light beam from said light source;
   an optical focusing system for focusing the light beam from said light source and guiding the focused light beam to said recording medium;
   focused-spots generating means for dividing said light beam into a plurality of light beams and enabling said optical focusing system to generate a plurality of focused spots in an auxiliary scanning direction on said recording medium from said plurality of light beams;
   number-of-focused-spots control means for controlling the number of focused spots generated by said focused-spots generating means depending on the resolution of the image to be recorded on said recording medium; and auxiliary scanning control means for controlling recorded intervals in said auxiliary scanning direction depending on said resolution,
wherein said number-of-focused-spots control means comprises displacement control means for displacing said focused-spots generating means selectively into and out of a path of said light beam.

17. An exposure recording apparatus comprising:
a light source for emitting a light beam;
a recording medium for recording an image thereon upon being scanned by said light beam from said light source;
an optical focusing system for focusing said light beam from said light source and guiding said focused light beam to said recording medium, said optical focusing system including:
a first cylindrical lens which serves as a beam-shaping optical element for focusing said light beam in an auxiliary scanning direction;
a second cylindrical lens which serves as a beam shaping optical element for focusing said light beam in a main scanning direction;
a polarizing optical element, which divides said light beam into a plurality of light beams and enables said optical focusing system to generate a plurality of focused spots in the auxiliary scanning direction on said recording medium from said plurality of light beams; and
a wave plate, which adjusts, a number of focused spots generated by said polarizing optical element depending on a resolution of said image to be recorded on said recording medium; and
a motor driver, which controls recorded intervals in the auxiliary scanning direction depending on said resolution by moving said optical focusing system.

18. The exposure recording apparatus of claim 17, wherein said first and said second cylindrical lenses are disposed between said wave plate and said recording medium.

19. The exposure recording apparatus of claim 17, wherein said wave plate comprises a half-wave plate.

20. An exposure recording apparatus comprising:
a light source for emitting a light beam;
a recording medium for recording an image thereon upon being scanned by the light beam from said light source;
an optical focusing system for focusing the light beam from said light source and guiding the focused light beam to said recording medium;
focused-spots generating means for dividing said light beam into a plurality of light beams and enabling said optical focusing system to generate a plurality of focused spots in an auxiliary scanning direction on said recording medium from said plurality of light beams;
number-of-focused-spots control means for controlling the number of focused spots generated by said focused-spots generating means depending on the resolution of the image to be recorded on said recording medium; and
auxiliary scanning control means for controlling recorded intervals in said auxiliary scanning direction depending on said resolution,
wherein said focused-spots generating means comprises a polarizing optical element for separating said light beam into two light beams which are polarized in different directions, and
wherein said number-of-focused-spots control means comprises a half-wave plate or a quarter-wave plate disposed between said light source and said polarizing optical element and angularly movable about the optical axis of the polarized light beam, for controlling the direction of polarization of the light beam applied to said polarizing optical element depending on said resolution for thereby controlling the number of focused spots.

21. An exposure recording apparatus comprising:
a light source for emitting a light beam;
a recording medium for recording an image thereon upon being scanned by the light beam from said light source;
an optical focusing system for focusing the light beam from said light source and guiding the focused light beam to said recording medium;
focused-spots generating means for dividing said light beam into a plurality of light beams and enabling said optical focusing system to generate a plurality of focused spots in an auxiliary scanning direction on said recording medium from said plurality of light beams;
number-of-focused-spots control means for controlling the number of focused spots generated by said focused-spots generating means depending on the resolution of the image to be recorded on said recording medium; and
auxiliary scanning control means for controlling recorded intervals in said auxiliary scanning direction depending on said resolution,
wherein said focused-spots generating means comprises a polarizing optical element for separating said light beam into two light beams which are polarized in different directions, and
wherein said number-of-focused-spots control means comprises a polarizer disposed between said light source and said polarizing optical element and angularly movable about the optical axis of the light beam which is substantially circularly polarized or randomly polarized, for controlling the direction of polarization of the light beam applied to said polarizing optical element depending on said resolution for thereby controlling the number of focused spots.

22. An exposure recording apparatus comprising:
a light source for emitting a light beam;
a recording medium for recording an image thereon upon being scanned by said light beam from said light source;
an optical focusing system for focusing said light beam from said light source and guiding said focused light beam to said recording medium, said optical focusing system including:
a first cylindrical lens which serves as a beam-shaping optical element for focusing said light beam in an auxiliary scanning direction;
a second cylindrical lens which serves as a beam shaping optical element for focusing said light beam in a main scanning direction;
a polarizing optical element, which divides said light beam into a plurality of light beams and enables said optical focusing system to generate a plurality of focused spots in the auxiliary scanning direction on said recording medium from said plurality of light beams; and
a wave plate, which adjusts a number of focused spots generated by said polarizing optical element depending on a resolution of said image to be recorded on said recording medium; and a motor driver, which controls recorded intervals in the auxiliary scanning direction depending on said resolution by moving said optical focusing system, wherein said motor driver, which controls recorded intervals in the auxiliary scanning direction depending on said resolution, also controls angular movement of said wave plate.

* * * * *